US009131066B2

(12) United States Patent
Masuda

(10) Patent No.: US 9,131,066 B2
(45) Date of Patent: Sep. 8, 2015

(54) WIRELESS COMMUNICATION APPARATUS

(71) Applicant: Masaya Masuda, Tokyo (JP)

(72) Inventor: Masaya Masuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/245,363

(22) Filed: Apr. 4, 2014

(65) Prior Publication Data

US 2014/0221042 A1 Aug. 7, 2014

Related U.S. Application Data

(63) Continuation of application No. 12/950,980, filed on Nov. 19, 2010, now abandoned, which is a continuation of application No. 12/265,932, filed on Nov. 6, 2008, now abandoned.

(30) Foreign Application Priority Data

Dec. 26, 2007 (JP) ................. P2007-334740

(51) Int. Cl.
*H04W 4/00* (2009.01)
*H04M 1/725* (2006.01)
*H04W 4/02* (2009.01)
*H04W 4/20* (2009.01)
*H04L 29/08* (2006.01)

(52) U.S. Cl.
CPC ........... *H04M 1/72572* (2013.01); *H04L 67/18* (2013.01); *H04M 1/7253* (2013.01); *H04W 4/02* (2013.01); *H04W 4/20* (2013.01); *H04M 2250/10* (2013.01)

(58) Field of Classification Search
CPC .................................... H04W 4/008
USPC ...................... 455/41.1, 41.2, 41.3
See application file for complete search history.

(56) References Cited

U.S. PATENT DOCUMENTS

| | | | |
|---|---|---|---|
| 6,996,402 B2 | 2/2006 | Logan et al. | |
| 7,203,517 B2 | 4/2007 | Shimoda et al. | |
| 7,873,351 B2 | 1/2011 | Yahagi | |
| 8,428,645 B2 * | 4/2013 | Rao ........................... | 455/552.1 |
| 2002/0059453 A1 | 5/2002 | Eriksson et al. | |
| 2002/0183006 A1 | 12/2002 | Yasushi et al. | |

(Continued)

FOREIGN PATENT DOCUMENTS

| | | |
|---|---|---|
| EP | 0 967 815 A2 | 12/1999 |
| JP | 2000-83284 | 3/2000 |

(Continued)

*Primary Examiner* — Wen Huang
(74) *Attorney, Agent, or Firm* — Finnegan, Henderson, Farabow, Garrett & Dunner, L.L.P.

(57) ABSTRACT

A wireless communication apparatus comprises a selection module to select an application from applications to be run on the apparatus, a movement information generation module to generate movement information indicating positional change of the apparatus by detecting a position of the apparatus, a target selection module to select a counterpart wireless communication apparatus as a connection target from other apparatuses which are wirelessly connectable with the apparatus by referring to to a type of the application selected by the selection module and the movement information generated by the movement information generation module, and a wireless communication module wirelessly transmits data handled by the application to the counterpart wireless communication apparatus selected by the target selection module.

7 Claims, 7 Drawing Sheets

(56) References Cited

U.S. PATENT DOCUMENTS

| | | |
|---|---|---|
| 2003/0073412 A1* | 4/2003 | Meade, II .................... 455/70 |
| 2003/0093422 A1* | 5/2003 | Yamamoto et al. ............. 707/3 |
| 2004/0176117 A1 | 9/2004 | Strittmatter et al. |
| 2005/0054290 A1* | 3/2005 | Logan et al. ................ 455/41.2 |
| 2006/0084381 A1 | 4/2006 | Hartwig |
| 2006/0229014 A1 | 10/2006 | Harada et al. |
| 2007/0015485 A1* | 1/2007 | DeBiasio et al. ............ 455/345 |
| 2008/0004075 A1 | 1/2008 | Horton |
| 2008/0085706 A1 | 4/2008 | Nagata et al. |
| 2009/0061776 A1 | 3/2009 | Takei et al. |
| 2009/0098825 A1 | 4/2009 | Huomo et al. |
| 2009/0117848 A1 | 5/2009 | Nagata et al. |

FOREIGN PATENT DOCUMENTS

| | | |
|---|---|---|
| JP | 2001-256152 | 9/2001 |
| JP | 2001-309445 | 11/2001 |
| JP | 2004-72136 | 3/2004 |
| JP | 2005-44024 | 2/2005 |
| JP | 2005-08510 | 3/2005 |
| JP | 2006-319946 | 11/2006 |
| JP | 2007-067723 | 3/2007 |

* cited by examiner

FIG. 4

| CONNECTION TARGET | BD ADDRESS | FUNCTION TYPE | POSITIONAL INFORMATION | USAGE FREQUENCY | PRIORITY LEVEL |
|---|---|---|---|---|---|
| DISPLAY DEVICE 400 | XX-XX-XX-0A-00-01 | IMAGE TRANSFER | A | MEDIUM | MEDIUM |
| PRINTER 500 | XX-XX-XX-0A-00-02 | IMAGE TRANSFER | B | LOW | LOW |
| WIRELESS HEADPHONE 200 | XX-XX-XX-0A-00-03 | MUSIC PLAYBACK | FREE | HIGH | HIGH |
| SPEAKER 300 | XX-XX-XX-0A-00-04 | MUSIC PLAYBACK | A | MEDIUM | MEDIUM |
| SPEAKER 700 | XX-XX-XX-0A-00-05 | MUSIC PLAYBACK | B | MEDIUM | MEDIUM |
| PC 600 | XX-XX-XX-0A-00-06 | TRANSMISSION OF ADDRESS BOOK | B | MEDIUM | MEDIUM | ns
WIRELESS COMMUNICATION APPARATUS

This is a continuation of U.S. patent application Ser. No. 12/950,980, filed Nov. 19, 2010, currently pending, which is a continuation of U.S. patent application Ser. No. 12/265,932, filed Nov. 6, 2008, now abandoned. The entire contents of these applications are incorporated herein by reference.

CROSS-REFERENCE TO RELATED APPLICATIONS

The application is based upon and claims the benefit of priority from Japanese Patent Application No. 2007-334740, filed on Dec. 26, 2007, the entire content of which are incorporated herein by reference.

BACKGROUND

1. Field

One embodiment of the present invention relates to a wireless communication apparatus.

2. Description of the Related Art

Conventionally, as a wireless communication technology has been progressed, a wireless communication apparatus having a wireless communication function on a mobile device, such as a portable cellular phone, a PDA (Personal Digital Assistant), and a digital camera, are widely used. The wireless communication apparatus transmits and receives content data, such as audio data and video data, by being wirelessly connected with electronic apparatus such as a personal computer and a cellular phone.

Among the conventional devices, there is proposed a wireless communication apparatus that selects connection interfaces in accordance with a positional information about a position of the wireless communication apparatus. For example, JP-A-2001-309445 discloses an automatic network switching system that enables automatic selection and setting of optimum network connection interfaces when a wireless communication apparatus is on the move or located at a location of the movement.

Although the document, JP-A-2001-309445, describes selecting an optimum network among a plurality of available networks, no consideration is given to selection of a wireless communication apparatus to be a counterpart device for establishing a communication. Therefore, when there are a plurality of devices serving as a counterpart device of the wireless communication, the user per se must select the counterpart device as a target of the wireless communication (hereinafter simply called a "counterpart wireless communication apparatus" or a "counterpart device").

Moreover, for example, when the user carries and moves the wireless communication apparatus, the user must reselect the counterpart wireless communication apparatus at each location every time the user moves into another location, and hence the wireless communication apparatus lacks convenience.

SUMMARY

According to an embodiment of the present invention, there is provided a wireless communication apparatus including: a selection module to select an application program from application programs to be run on the apparatus; a movement information generation module to generate movement information indicating positional change of the apparatus by detecting a position of the apparatus; a target selection module to select a counterpart wireless communication apparatus as a connection target from other apparatuses which are wirelessly connectable with the apparatus by referring to a type of the application selected by the selection module and the movement information generated by the movement information generation module; and a wireless communication module to transmit data handled by the application to the counterpart wireless communication apparatus selected by the target selection module.

According to an embodiment of the present invention, there is provided a wireless communication apparatus including: a storage module to store content data to be handled by the apparatus; a selection module to select content data from the content data stored in the storage module; a movement information generation module to generate movement information indicating positional change of the apparatus by detecting a position of the apparatus; a target selection module to select a counterpart wireless communication apparatus as a connection target from other apparatuses which are wirelessly connectable with the apparatus by referring to a type of the content data selected by the selection module and the movement information generated by the movement information generation module; and a wireless communication module to transmit the content data selected by the selection module to the counterpart wireless communication apparatus selected by the target selection module.

BRIEF DESCRIPTION OF THE SEVERAL VIEWS OF THE DRAWINGS

A general configuration that implements the various feature of the invention will now be described with reference to the drawings. The drawings and the associated descriptions are provided to illustrate embodiments of the invention and not to limit the scope of the invention.

FIG. 4 is a view showing example information pertaining to the external devices.

DETAILED DESCRIPTION

An embodiment of the present invention will be described with reference to the accompanying drawings.

Figure 1:
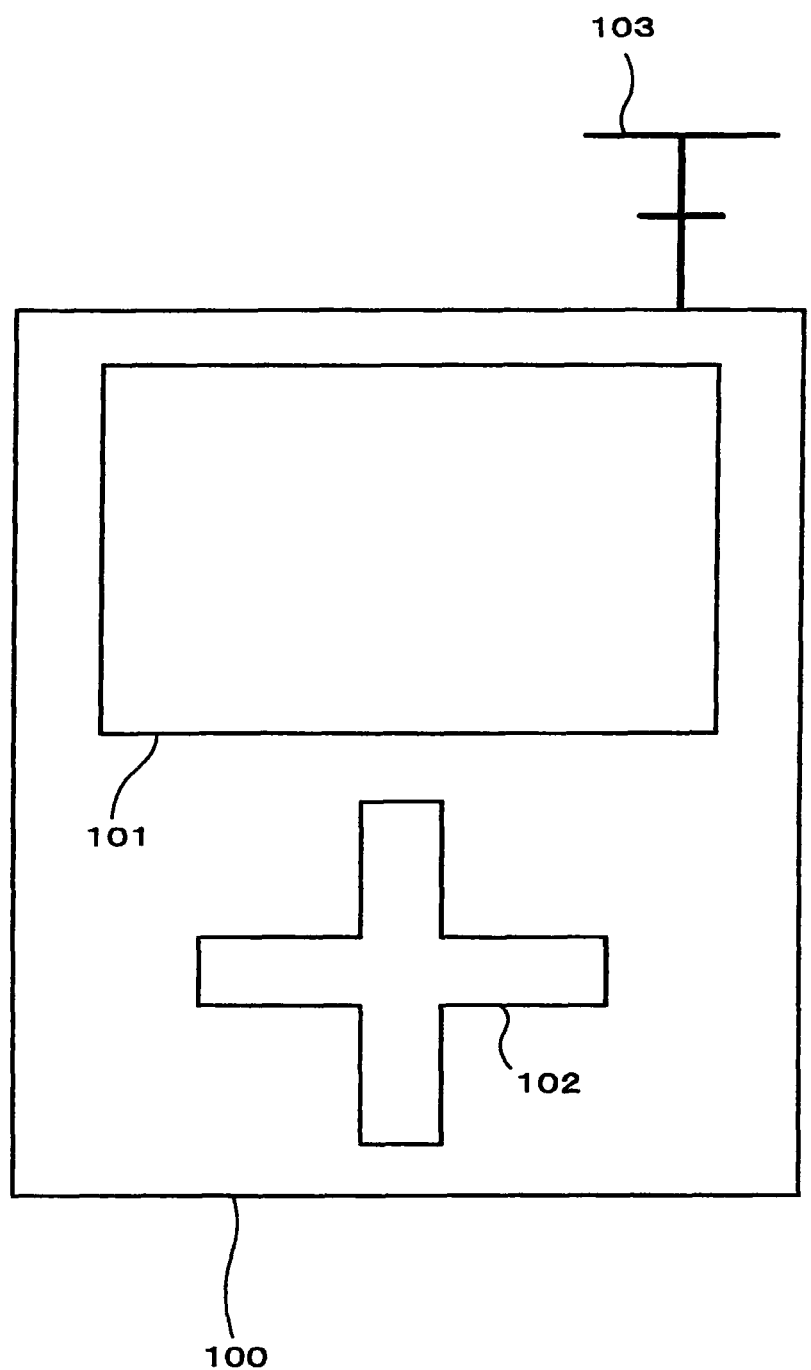
FIG. 1 is a view showing an example external view of a wireless communication apparatus according to an embodiment of the present invention.
Figure 2:
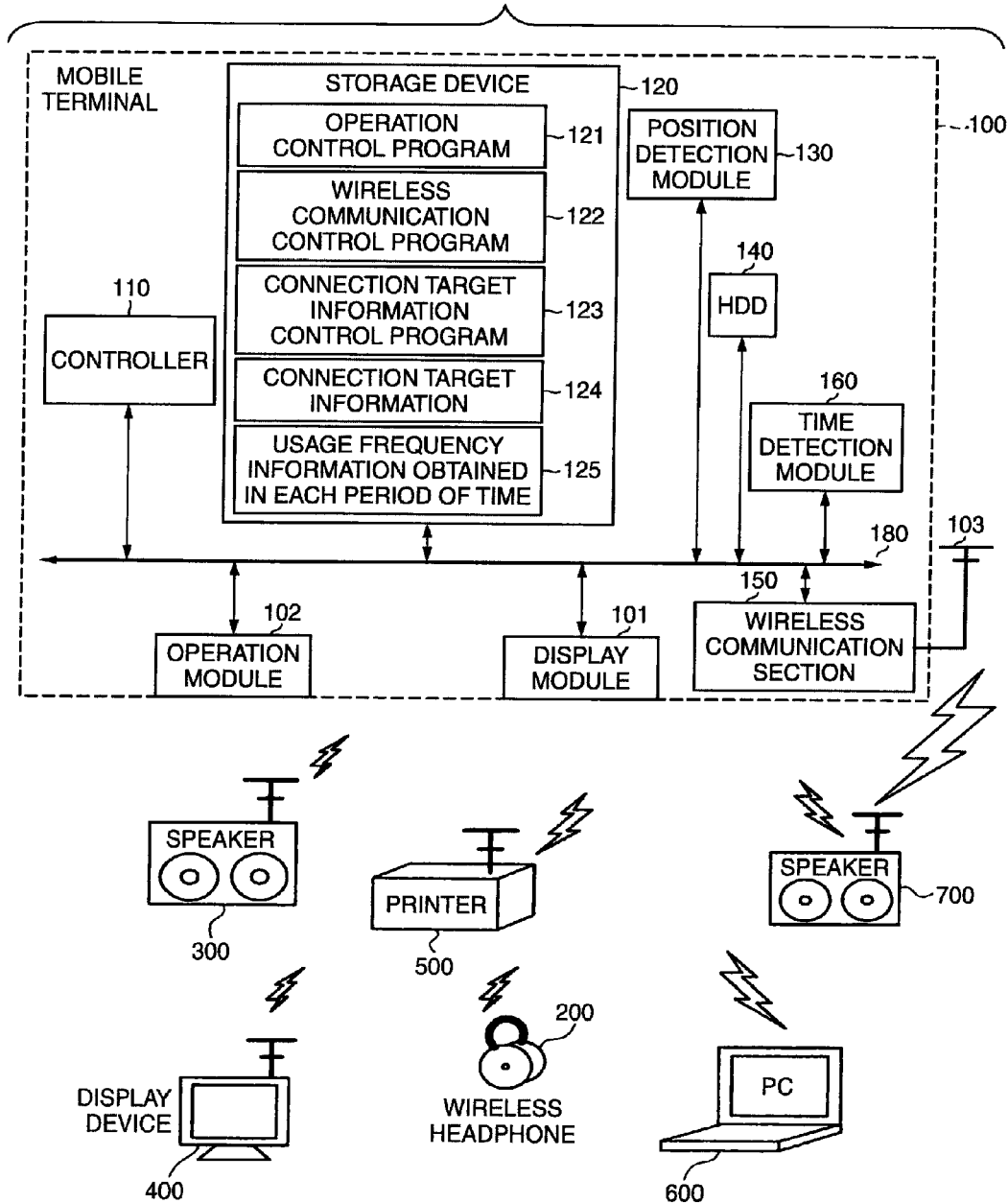
FIG. 2 is a view showing an example configuration of a system of a mobile terminal serving as the wireless communication apparatus of the embodiment.

Referring to FIGS. 1 and 2, a configuration of a wireless communication apparatus according to an embodiment of the present invention will be described. FIG. 1 shows an example appearance of the wireless communication apparatus. FIG. 2 is a view showing an example system configuration of a mobile terminal 100 serving as the wireless communication apparatus.

The mobile terminal 100 (wireless communication apparatus) transmits data handled by an application, such as a music playback application and an image transfer application, to a plurality of external devices 200 to 700 (counterpart wireless communication apparatuses).

The mobile terminal 100 has a function of selecting an external device with which a wireless connection is to be established from among a plurality of external devices based on movement information about the mobile terminal 100 and the type of the selected application. According to the function, an external device that appropriately processes and outputs the data transmitted from the mobile terminal 100 can be automatically selected without requiring a user to reselect or reconfigure the external device at each locations, whereby the user's convenience is enhanced.

The mobile terminal 100 allows the user to select an application installed in the mobile terminal 100 using a display module 101 and an operation module 102 and transmits data handled by the selected application to the respective external devices from the antenna 103 through wireless communication.

In FIG. 2, a wireless headphone 200, a speaker 300, a display device 400, a printer 500, a personal computer 600, and a speaker 700 are shown as examples of the external devices that are wirelessly connectable to the mobile terminal 100.

The mobile terminal 100 includes a display module 101, an operation module 102, an antenna 103, a controller 110, a storage device 120, a position detection module 130, an HDD (Hard Disk Drive) 140, a wireless communication section 150, and a time detection module 160.

The display module 101 displays a selection screen (not shown) for allowing the user to select applications installed in the mobile terminal 100 or content data stored in the HDD 140 to assist an operation input by the user through the operation module 102. The display module 101 also shows information for selecting external devices to the user. The information will be described later by referring to FIG. 3.

The operation module 102 is provided with, for example, a cross key, as a means for allowing the user to input operations. The operation module 102 also allows the user to newly register external devices and to input priority levels of the respective external devices.

Upon receipt of an instruction from a wireless communication control program 122, the wireless communication section 150 establishes a wireless connection through the antenna 103 to the external device selected by a method defined in standards, such as AVRCP (Audio/Video Remote Control Profile) of Bluetooth, A2DP (Advanced Audio Distribution Profile), VDP (Video Distribution Profile), BIP (Basic Imaging Profile), and the like. The wireless communication section 150 transmits data to be handled by an application installed in the mobile terminal 100 to the external device.

AVRCP is a profile for implementing a remote control function of AV (Audio/Video) equipment and used for performing pause, stop, playback start, sound control and other types of remote control. A2DP is a profile for implementing a function for distributing high quality audio and used at the time of transmission of audio data from a transmitter to a receiver. VDP is a profile for distributing a video and used for is transmitting video data from the transmitter to the receiver. BIP is a profile for implementing a function for transferring an image and used at the time of transfer of image data from the transmitter to the receiver.

The controller 110 controls the respective functions to operate in accordance with programs stored in the storage device 120. The controller 110 controls operation of the mobile terminal 100 by way of a bus 180.

The storage device 120 stores programs for the respective applications executed by the controller 110. The storage device 120 stores, for example, an operation control program 121 for controlling the mobile terminal 100; a wireless communication control program 122 for controlling the wireless communication section 150; a connection target information control program 123 for generating and updating positional information about external devices serving as the counterpart device and information about functions that can be processed and output by the external devices.

In addition to storing the programs for or various applications, the storage device 120 stores: connection target information 124 pertaining to the plurality of external devices generated and updated by the connection target information control program 123; and usage frequency information 125 that is generated from time detected by the time detection module 160 and that is obtained in each period of time in a predetermined location. The connection target information control program 123 and the usage frequency information 125 for each period of time will be described in detail by referring to FIGS. 3 and 7.

The position detection module 130 detects the current position of the mobile terminal 100 by use of information acquired from a GPS (Global Positioning System) and a base station, thereby generating movement information.

Movement information referred to in the description means information indicating a change in current position of the mobile terminal 100. The position detection module 130 periodically detects the current position of the mobile terminal 100 under control of the controller 110 and continually generates movement information. Further, the current position of the mobile terminal 100 detected by the position detection module 130 is indicated by three-dimensional coordinates representing, for example, latitude, longitude, and altitude. However, the current position is not limited to the coordinates. The position detection module 130 may be configured to detect and output the current position of the mobile terminal 100 by any method other than that described above.

The time detection module 160 detects a usage start time and a usage end time of the external device from a built-in wave clock (not shown), or the like, thereby measures a period of time during which the external device is used.

Further, the mobile terminal 100 transmits, as data to be processed and output by the external device, data to be handled by an application selected by the mobile terminal 100, such as a music playback application and an image transfer application. As long as the data are data that can be transmitted through wireless communication, image data and print data, such as an address book and a photograph, may also be transmitted in conformance with a processing function or output function of each of the external devices.

Accordingly, the essential requirement for the external device of the present embodiment is to have a wireless communication function of establishing wireless connection with the mobile terminal 100 and a function of processing and outputting data transmitted from the mobile terminal 100. In the embodiment, the mobile terminal 100 selects an external device and establishes wireless connection with the device. However, the external device may also transmit a connection request to the mobile terminal 100.

The present embodiment is based on the assumption that the user operates to transmit data pertaining to an application processed by the mobile terminal 100. However, the present invention is not limited to the embodiment. There may also be adopted an embodiment in which the user directly selects content data stored in the mobile terminal 100, such as audio data and image data, and in which an external device that appropriately plays back the content data is selected.

Figure 3:
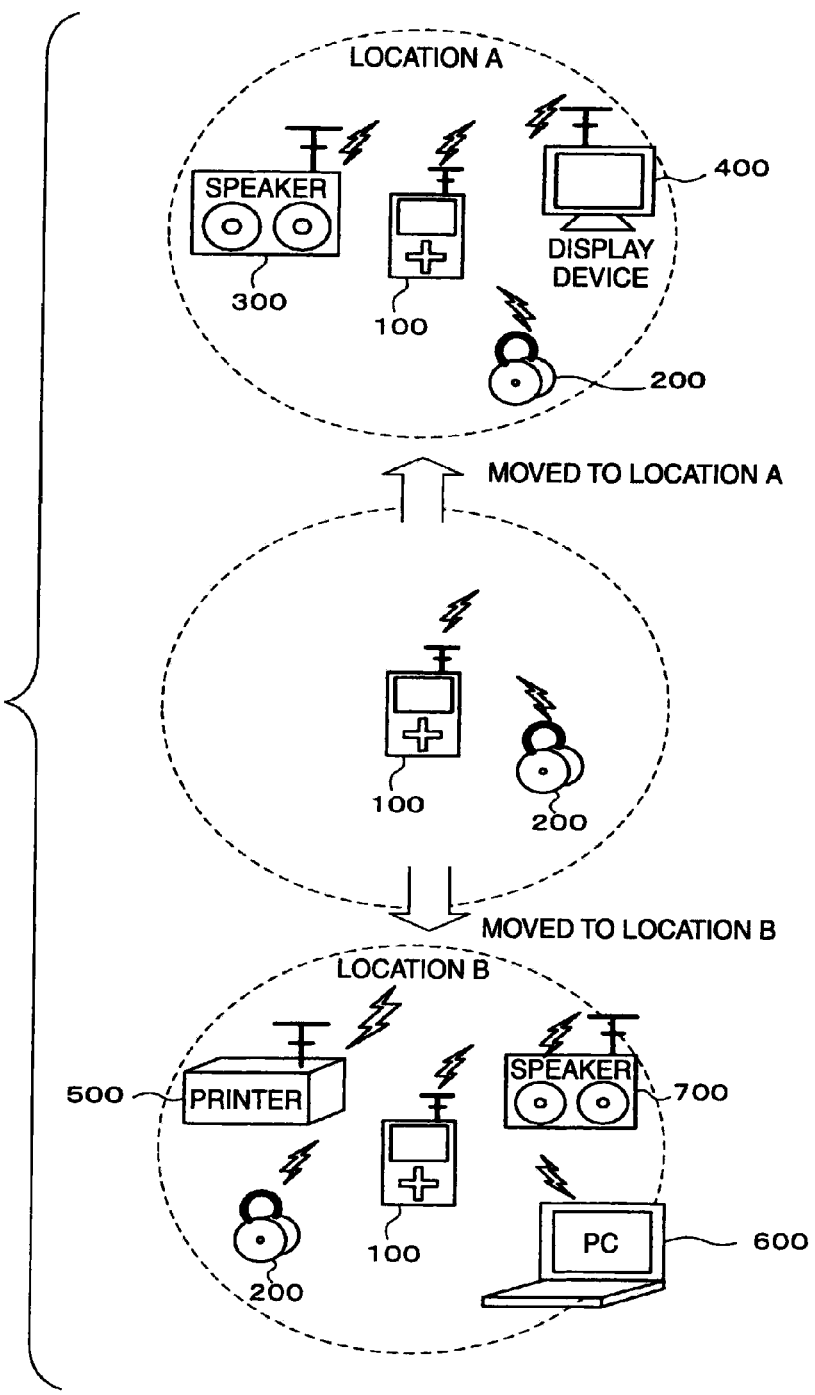
FIG. 3 is a view showing locations where the mobile terminal is to be moved in and external devices registered at the respective locations.

Information about selection of an external device of the present embodiment will now be described by reference to FIGS. 3 and 4. FIG. 3 is a view showing locations of the mobile terminal 100 of the present embodiment and external devices registered in the respective locations.

The mobile terminal 100 performs a search around the mobile terminal 100 through use of, for example, an Inquiry function defined in a Bluetooth standard, a search for a service belonging to the external device (which is synonymous with an application of the embodiment) by means of a method determined by SDAP (Service Discovery Application Profile) of the Bluetooth standard, or recognizes an output device that can be connected to the mobile terminal 100 by allowing the user to input information for identifying the service provided by the respective external devices, to thus register information about the external device as connection target information 124.

In the present embodiment, positional information about the external device is generated from the position of the mobile terminal 100 detected by the position detection module 130 at the time of registration of the external device, and the thus-generated information is registered while being included in the connection target information 124. Accordingly, the mobile terminal 100 refers to the positional information about the external device from the connection target information 124 registered in the past, thereby enabling selection of an external device that appropriately processes and outputs data transmitted at the respective locations.

Positional information about an external device of the present embodiment is set, as a space including an entire range where wireless connection is possible (e.g., a range of about 10-meter radius for class 2 Bluetooth standard), around a coordinate position of the mobile terminal 100 detected by the position detection module 130 at the time of performance of registration.

For example, when a coordinate position (a latitude, a longitude, and an altitude) of the mobile terminal 100 detected when registration is performed at the location A shown in FIG. 3 is a value of (x1, y1, z1), positional information about the respective external devices registered in the location A corresponds to a space that concentrically spreads from the coordinate (x1, y1, z1) and where wireless connection is feasible.

For example, in an example of external devices registered at respective locations shown in FIG. 3, a speaker 300 and a display device 400 are present as connectable external devices in the location A. A printer 500, a personal computer 600, and a speaker 700 are present as connectable external devices in a location B.

Specifically, positional information belonging to the speaker 300 and the display device 400 registered in the mobile terminal 100 pertain to the location A, respectively. Positional information belonging to the printer 500, the personal computer 600, and the speaker 700 pertain to the location B, respectively.

A device that is not set at a specific position and that is used while being carried by a user; as for example, a wireless headphone 200, is included in the external devices. However, in the present embodiment, the external devices are assumed to be registered after being set so as not to have specific positional information (referred to also as free setting).

FIG. 4 is a view showing an example of information about the external devices of the present embodiment. FIG. 4 shows names of external devices serving as target connections for the respective external devices 200 to 700; BD (Bluetooth Device) addresses, the types of applications, positional information, usage frequency, and priority levels of the external devices.

Names of the external devices serving as connection targets are designations of the devices, such as the display device 400 and the speaker 300, and the names are displayed in the display module 101 when the user directly designates the external device. The BD address of the external device is a value unique to Bluetooth equipment and used when the mobile terminal 100 specifies an external device. The type of an application shows the type of an application; for example, an image transfer application and a music playback application, which can be processed by an output device. Usage frequency corresponds to frequency determined from the number of times the external device was used in the past and hours during which the external device was used. In the present embodiment, usage frequency is indicated by three levels; namely, high frequency, medium frequency, and low frequency. Priority levels correspond to values showing priority levels of respective external devices set by the user. In the present embodiment, the priority levels are provided in three steps; namely, a high priority level, a medium priority level, and a low priority level. In the present embodiment, the same priority level is not set for external devices having the same positional information and the same processing-output functions. Since positional information is the same as that described by reference to FIG. 3, its explanation is omitted.

In the present embodiment, for example, when an input of a command for transmitting data to be handled by a selected application to an external device is received or when there is instructed execution of an application that is configured so as to automatically transmit data to an external device when executed, an external device is selected on the basis of the type of an application and movement information about the mobile terminal 100 generated by the position detection module 130.

For example, when a selected application corresponds to an image transfer application and when the location of the mobile terminal 100 detected by the position detection module 130 is in the location A, a candidate for connection target that has positional information about the location A among the external devices registered in the mobile terminal 100 and that can perform processing conforming to the image transfer application is only the display device 400 as shown in FIG. 4. Therefore, the display 400 is selected as an external device serving as a connection target.

In the present embodiment, when a plurality of external devices that are candidates for connection selected on the basis of the type of an application and movement information about the mobile terminal 100 are present, further selection is conducted on the basis of a priority level and usage frequency.

For example, the type of an application selected by the operation module 102 is a music playback application and when the location of the mobile terminal 100 detected by the position detection module 130 is the location B, two external devices; namely, the speaker 700 that has positional information about the location B and that can perform processing conforming to the music playback application and the wireless headphone 200 that can perform processing conforming to the music playback application and whose positional information is registered as being free setting, are mentioned as candidates among the external devices registered in the mobile terminal 100.

Accordingly, in order to select one external device, further selection is performed on the basis of the priority levels and use frequencies of the respective external devices. As shown in FIG. 4, in relation to the usage frequency and priority level of the speaker 700 and the usage frequency and priority level of the wireless headphone 200, the usage frequency and priority level of the wireless headphone 200 are registered as being set to higher values. The wireless headphone 200 is selected as a connection target for the mobile terminal 100.

When one external device is not selected on the basis is of a priority level and usage frequency, the user inputs a selection or registers a new priority level through the operation module 102.

FIGS. 3 and 4 show a case where an external device is selected on the basis of the type of data handled by an application selected by the user and movement information about the mobile terminal 100. However, the invention is not limited to the embodiment. In the present embodiment, an external device may also be selected on the basis of the type of content data selected by the user, such as video data and audio data, and movement information about the mobile terminal 100.

In relation to the case of selection of an external device on the basis of the type of content data, there may be employed with a method for making a selection after ascertaining whether or not a function for decompressing content data encoded and compressed by; for example, the MPEG scheme, and playing back the decompressed content data, and a function that enables processing or outputting of content data transmitted from a mobile terminal are provided.

Figure 5:
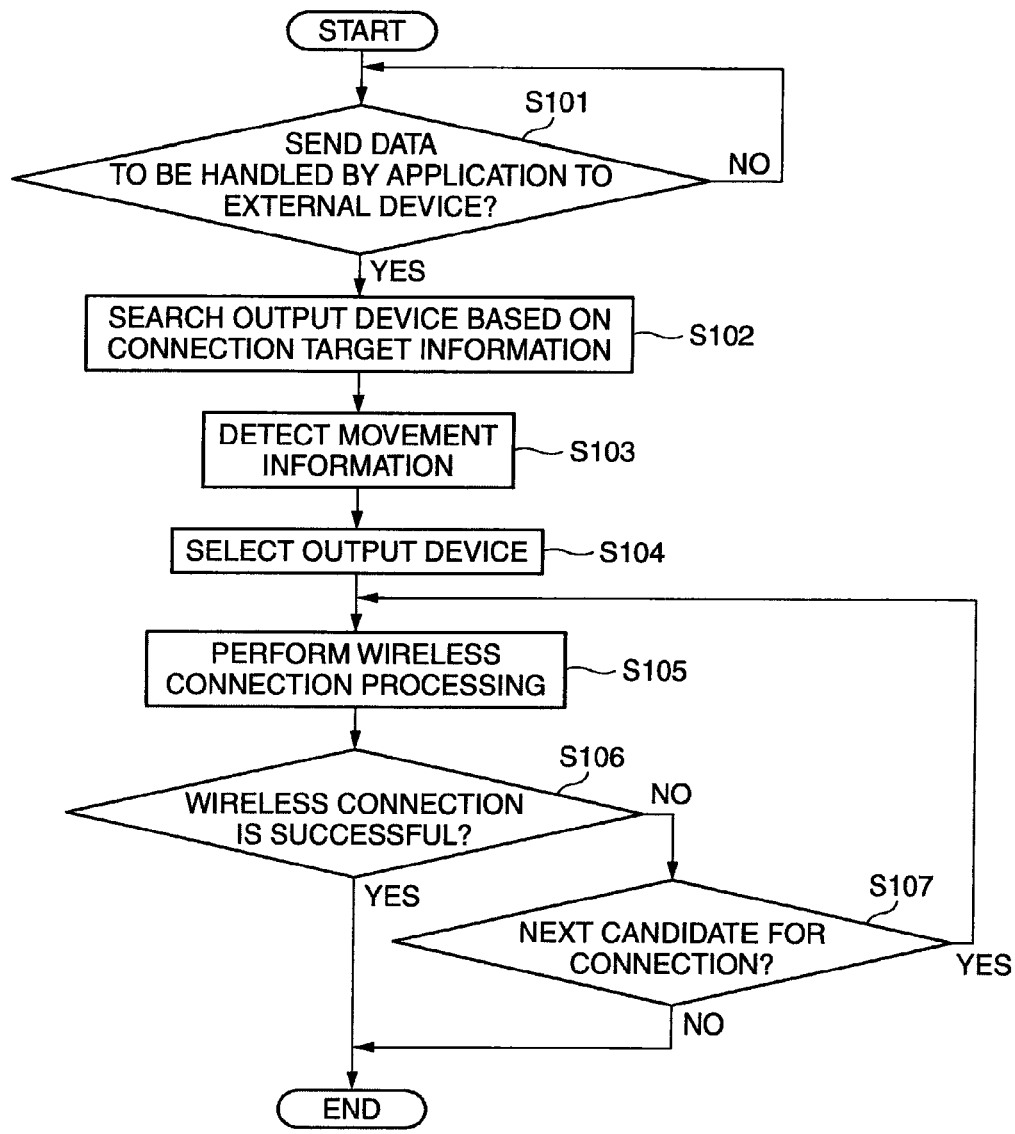
FIG. 5 is a flowchart showing selection of the external devices and flow of procedures of wireless connection.

Selection of an external device and flow of wireless connection procedures of the present embodiment will now be described by reference to FIG. 5. FIG. 5 is a flowchart showing selection of an external device and flow of wireless connection procedures of the present embodiment. It is assumed that the user selects an application.

In the mobile terminal 100 of the present embodiment, when the operation module 102 accepts an operation input, the controller 110 determines whether or not the operation input is a command for selecting an application, such as a music playback application and an image transfer application, and transmitting data to be handled by the application to an external device (step S101). When the operation input performed at this time is not a command for transmitting data to be handled by the application to an external device (No in step S101), the controller 110 returns processing to step S101.

When the operation input performed in step S101 is a command for transmitting data to be handled by the selected application to an external device (Yes in step S101), the controller 110 searches an external device capable of processing and outputting data to be handled by the application from the connection target information 124 on the basis of the type of the application selected by the user (step S102).

Next, the controller 110 controls the position detection module 130 to detect the current position of the mobile terminal 100, thereby generating movement information (step S103). On the basis of the movement information about the mobile terminal 100 generated by the position detection module 130, the controller 110 selects an external device appropriate at a location from among the external devices that can process and output data to be handled by an application and that have been searched in step S102 (step S104).

When an external device is selected in step S104, the controller 110 initiates a wireless connection with the external device (step S105). The controller 110 determines whether or not a wireless connection with the external device has become successful (step S106). When the wireless connection is successful (Yes in step S106), processing is completed.

When the controller 110 determines, in step S106, that the wireless connection ended in a failure (No in step S106), the controller 110 deems the selected external device as being unusable and searches another external device which will be another candidate for connection from the connection target information 124 (step S107).

When another external device can be found through processing pertaining to step S107 (Yes in step S107), the controller 110 returns processing to step S105 and initiates a wireless connection with the found external device. When another external device cannot be found (No in step S107), processing is completed.

Figure 6:
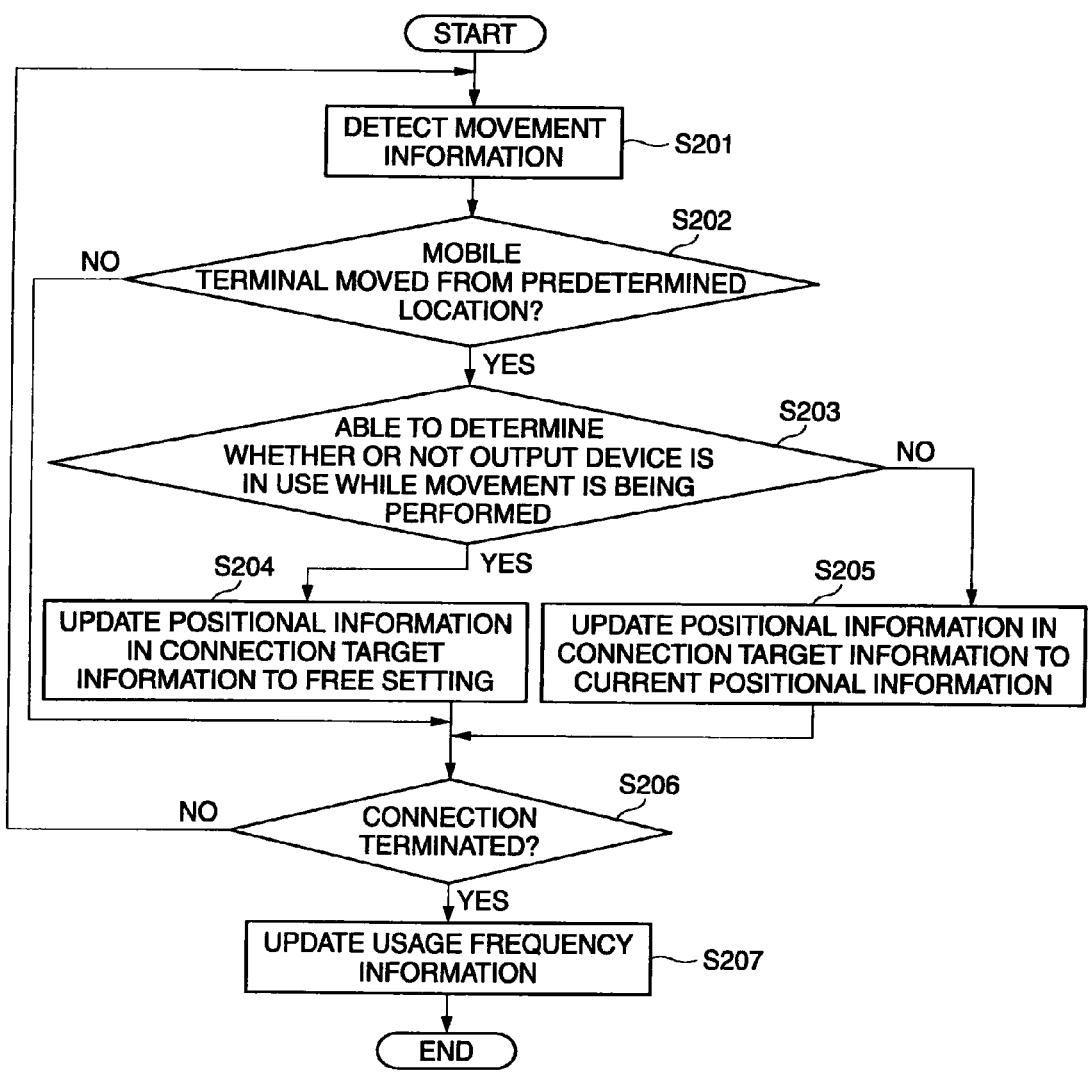
FIG. 6 is a flowchart showing procedures of position information update operation.

Positional information update flow for updating positional information about an external device registered in the mobile terminal 100 will now be described by reference to FIG. 6. FIG. 6 is a flowchart showing procedures of positional information update operation of the present embodiment.

While remaining in wireless connection with the external device, the controller 110 controls the position detection module 130 to generate movement information about the mobile terminal 100 (step S201). On the basis of the movement information generated by the position detection module 130, the controller 110 determines whether or not the mobile terminal 100 has moved (step S202).

When determined that the mobile terminal 100 has moved (Yes in step S202), the controller 110 next determines whether or not the mobile terminal 100 is on the continual movement without staying in a predetermined location and whether or not the wireless connection with the external devices is still maintained; namely, whether or not the mobile terminal is using the external device while on the movement (step S203). When the mobile terminal 100 is determined not to be on the movement in step S202 (No in step S202), the controller 110 proceeds to processing pertaining to step S206.

When the positional information about the mobile terminal 100 shows continual movement without staying at a predetermined position and when the wireless connection with the external device is maintained; namely, when the mobile terminal 100 is using the external device while on the movement (Yes in step S203), the controller 110 updates, as a free setting, the positional information about the external device stored in the connection target information 124 (step S204) and proceeds to processing pertaining to step S206.

When the mobile terminal 100 stays at a predetermined position after movement in step S203 and when the wireless connection with the external device is maintained; namely, when the mobile terminal 100 is using the external device in a space outside the registered space (No in step S203), the controller 110 newly generates positional information about the external device from the current position of the mobile terminal 100 that the position detection module 130 was caused to detect; updates the connection target information 124 (step S205); and proceeds to processing pertaining to the step S206.

Next, the controller 110 determines whether or not the wireless connection with the external device is disconnected (step S206). It is assumed that the controller 110 has searched, from the connection target information 124, another external device which appropriately processes and outputs data handled by the application selected at a location and switched the wireless connection and that the user has disconnected the wireless connection by way of the display module 101.

When determined that the wireless connection with the external device is not yet disconnected (No in step S206), the controller 110 returns to processing pertaining to step S101. When determined that the wireless connection with the external device is disconnected (Yes in step S206), the controller 110 updates usage frequency information about the external device registered in the connection target information 124 (step S207) and terminates processing.

In the above description, a case where registration information, such as positional information and usage frequency information, about the external device is updated in association with a change in the positional information about the mobile terminal 100 is described. However, in the present embodiment, the mobile terminal 100 also has a function for updating the usage frequency information 125 about a predetermined location in each period of time in association with a change in time. In the present embodiment, an external device that appropriately processes and outputs data to be handled by a selected application can be selected, by means of the above function, for each period of time even in a single predetermined location, and a wireless connection can be switched.

The usage frequency information 125 obtained in each period of time in the present embodiment is information showing, in the respective spaces registered in the mobile terminal 100, use frequencies of the respective external devices in; for example, each predetermined period of time and includes an average time when use of each of the external devices is started and an average time when use of each of the external devices is completed.

Figure 7:
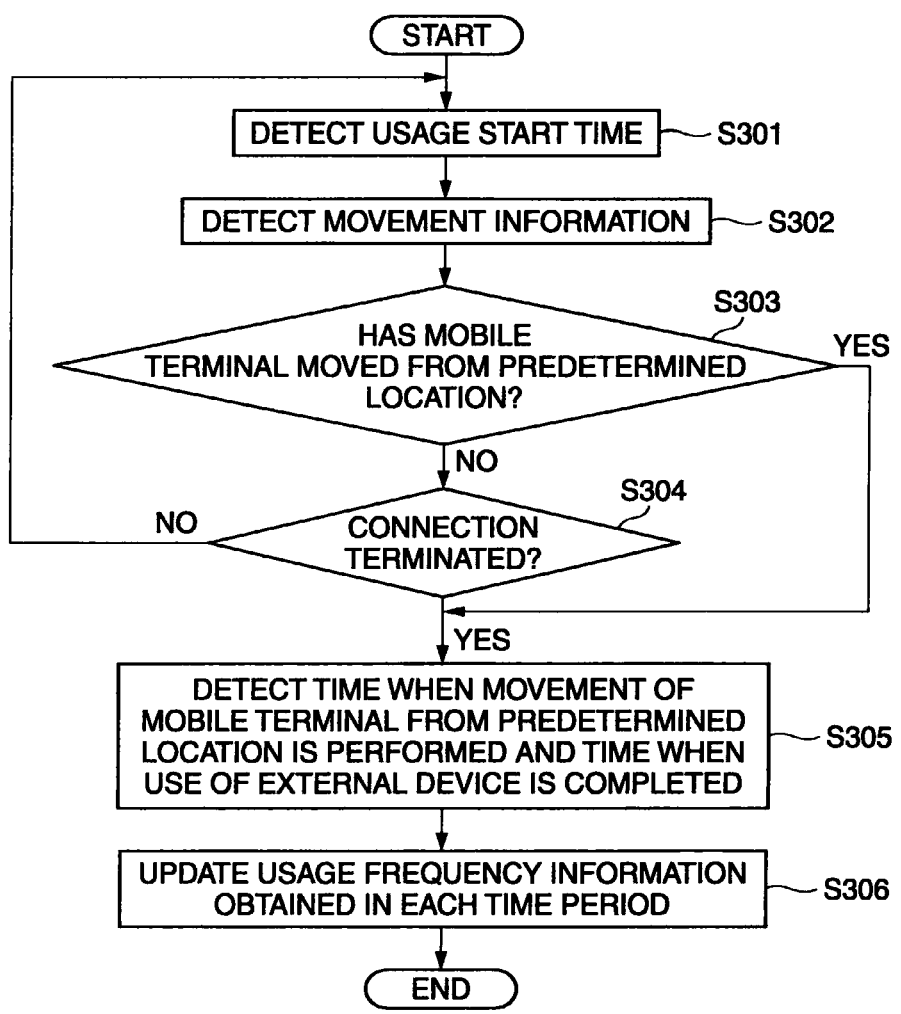
FIG. 7 is a flowchart showing a flow of updating of usage frequency information about the external devices obtained in each period of time.

A function of updating the usage frequency information 125 about the external devices of the present embodiment obtained in each period of time will be described hereunder by reference to FIG. 7. FIG. 7 is a flowchart showing a flow of updating of the usage frequency information 125 about the external devices of the present embodiment obtained in each period of time.

After selection of the external device described by reference to FIG. 5 and initiation of wireless connection, the controller 110 controls the time detection module 160 to detect a time at which use of the external device is started (step S301). Next, in a state where a wireless connection is established with the external device, the controller 110 controls the position detection module 130 to generate movement information about the mobile terminal 100 (step S302).

The controller 110 determines from the movement information generated in step S302 whether or not the mobile terminal 100 has moved from the predetermined location (step S303). When the mobile terminal 100 is determined to have moved from the predetermined location (Yes in step S303), the controller 110 proceeds to processing pertaining to step S306.

When the mobile terminal 100 is determined not to have moved from the predetermined location in step S202 (No in step S303), it is determined whether or not the wireless connection with the external devices is disconnected (step S304).

When the controller 110 determines in step S304 that the wireless connection with the external devices is not disconnected (No in step S304), the controller 110 proceeds to processing pertaining to step S302, where ascertainment of movement information is iterated.

When the wireless connection with the external devices is determined to be disconnected in step S304 (Yes in step S304), the controller 110 controls the time detection module 160 to detect a time at which the mobile terminal has moved from the predetermined location or a time when use of the external devices is completed (step S305).

When processing pertaining to step S305 is completed, the controller 110 updates the usage frequency information 125 obtained in each period of time within the predetermined location stored in the storage device 120 (step S306) and completes processing.

As mentioned above, according to the present embodiment, an external device capable of appropriately processing and outputting data handled by a selected application at a location can be selected without involvement of operation for selecting a device to be connected and a change setting operation, which has hitherto been performed by the user in association with movement of the mobile terminal 100, whereupon user's convenience is enhanced. Moreover, in the present embodiment, there can be selected an external device capable of appropriately processing and outputting data handled by an application that is selected on the basis of the usage frequency information represented by the number of times external devices were used and times during which the external devices were used as well as of the priority level of the external devices set by the user.

According to the present embodiment, the priority level of the external device can be input through the operation module 102. Hence, standards for selecting the external devices can be set in accordance with the user's preference. Further, in the present embodiment, registration information about the external devices is updated in accordance with a change in the space where the mobile terminal 100 of the present embodiment is situated and a change in the time. Hence, an external device capable of appropriately processing and outputting data handled by an application selected in accordance with a change in use conditions of the mobile terminal 100 can be selected.

In the present embodiment, when a wireless connection with the selected external device could not be established or when use of the selected external devices is impossible, the next candidate capable of appropriately processing and outputting data handled by a selected application is searched, and establishment of a wireless connection with the thus-searched candidate can be initiated.

In the present embodiment, there can be selected an output device capable of appropriately processing and outputting content data selected by the user, in accordance with the type of the content data.

Moreover, in the present embodiment, the wireless communication apparatus has a function for establishing a wireless connection in response to a request from an external device. Hence, the mobile terminal 100 can be activated from the external device.

The present invention is not limited to the embodiment described above, and the present invention may be embodied by varying the constituent elements within a scope not departing from a gist thereof in the implementing stage. Also, various modifications of the embodiment can be achieved by using an appropriate combination of a plurality of constituent elements disclosed in the embodiment. For example, some elements and components may be omitted from the configuration described in the embodiment. In addition, the constituent elements may be combined appropriately throughout different embodiments.

What is claimed is:
1. A digital audio player device, comprising:
a location detection module configured to receive a positional signal and output positional information for determining a positional location of the digital audio player;
a wireless communication module configured to establish a wireless connection with an external audio output device;
a storage configured to store audio data and an audio playback application program;
a user interface configured to receive input from a user; and
a processor configured to:
run the audio playback application program;
determine the positional location of the digital audio player based on the positional information;

allow the user to preset a combination of a condition and an action to be taken if the condition is satisfied;

determine whether the condition is satisfied;

control the wireless communication module to execute the action if determined that the condition is satisfied; and control the wireless communication module to start establishing the wireless connection with the external audio output device and to transmit the audio data to the external audio output device if determined that a first condition is satisfied, the first condition being that the positional location is within a preset first location and that the audio playback application program is currently running.

2. The device of claim 1, wherein the processor is configured to control the wireless communication module to terminate transmitting the audio data to the external audio output device and to terminate the wireless connection with the external audio output device if determined that a second condition is satisfied, the second condition being that the positional location is changed to move out from a preset first location and that the audio playback application program is currently running.

3. The device of claim 1, wherein the processor determines whether the condition is satisfied if determined that the positional location is changed to be within one area from another area.

4. The device of claim 1, wherein the processor determines whether the condition is satisfied if determined that the user interface received input from the user to select one of the multiple application programs to start running.

5. The device of claim 1, wherein the wireless communication module is configured to establish the wireless connection of a Bluetooth standard.

6. The device of claim 5, wherein the wireless communication module is configured to establish the wireless connection of an A2DP profile of the Bluetooth standard.

7. The device of claim 1, wherein the wireless communication module is configured to establish a wireless connection with multiple external audio output devices including a first external audio output device and a second external audio output device, and wherein the processor controls the wireless communication module to establish the wireless connection with the second external audio output device if the wireless communication module fails to establish the wireless connection with the first external audio output device.

* * * * *